United States Patent [19]

Lin

[11] Patent Number: 4,997,397
[45] Date of Patent: Mar. 5, 1991

[54] ELECTRIC CONNECTING CLAMP

[76] Inventor: Johnson Lin, No. 170, Sec. 1, Chung-Ching Rd., Ta-Yo Hsiang, Taichung Hsien, Taiwan

[21] Appl. No.: 545,862
[22] Filed: Jun. 29, 1990
[51] Int. Cl.⁵ ............................................. H01R 4/48
[52] U.S. Cl. ................................... 439/819; 439/824; 439/838
[58] Field of Search ............................. 439/828–829, 439/819, 822, 824, 729, 840, 482–483, 478, 729, 835, 838

[56] References Cited

U.S. PATENT DOCUMENTS

| | | | |
|---|---|---|---|
| 2,574,043 | 11/1951 | Lannou | 439/729 |
| 3,821,689 | 6/1974 | Graham | 439/829 X |
| 3,996,511 | 12/1976 | Baer | 439/482 X |
| 4,151,462 | 4/1979 | Teyler | 439/829 X |
| 4,904,213 | 2/1990 | Hock et al. | 439/824 |

FOREIGN PATENT DOCUMENTS

| | | | |
|---|---|---|---|
| 0263897 | 8/1968 | Fed. Rep. of Germany | 439/482 |
| 0492841 | 11/1975 | U.S.S.R. | 439/482 |
| 0553869 | 6/1943 | United Kingdom | 439/482 |

Primary Examiner—David L. Pirlot
Assistant Examiner—J. R. Daulton
Attorney, Agent, or Firm—Ladas & Parry

[57] ABSTRACT

An electric connecting clamp for an ignition unit of a model engine has a cell casing which is threadably coupled with a fixed clamping member at the front end thereof. The fixed clamping has a forwardly extending first clamping portion of arc-shaped cross-section. A movable clamping member is pivotally attached to the fixed clamping member. The movable clamping member has a second clamping portion of arc-shaped cross-section which has a front end to define a mouth with the front end of the first clamping portion. An inclining portion extends rearward and radially outward from the second clamping portion and is pivoted to the fixed clamping member. A conductor extends from the cell casing to a contact member provided adjacent the mouth. The contact member is biased to the mouth and the second clamping portion is biased to the first clamping portion.

3 Claims, 5 Drawing Sheets 4,997,397

ELECTRIC CONNECTING CLAMP

BACKGROUND OF THE INVENTION

This invention relates to an electric connecting clamp to electrically energize an ignition unit of a model engine used in a remotely controlled model such as a model aircraft or the like.

It is known that the ignition unit of a model engine is ignited by connecting the ignition unit to an electric source through an electric clamp. FIG. 1 shows a known cylindrical electric clamp 3 which incorporates two terminal units 2. The cylindrical electric clamp 3 is not provided with any electric source. It connects the ignition unit to an electric source by means of the terminal units 2 which can be connected to a battery.

FIG. 2 shows another electric clamp 4 which comprises a casing 6 to accommodate a dry cell, a cylindrical clamp member 7 with a split clamping portion 7a, and a movable sleeve 5 disposed around the cylindrical clamp member 7. Both the split portion 7a and the sleeve 5 are provided with bottom flared portions. A helical spring 8 is also disposed around the cylindrical clamp member 7. The cylindrical clamp member 7 is normally placed in a clamping position since the sleeve 5 is biased by the spring 8. It can be placed in a releasing position by moving the sleeve 5 against the spring 8. This electric clamp has some drawbacks. The cell casing of this electric connecting clamp is a closed type, and does not permits replacement of the dry cell so that the clamp has to be discarded when the dry cell is spent. In addition, it is difficult to machine the split clamp portion 7a and the sleeve 5, and to assemble the parts constituting the electric clamp, thereby increasing the manufacturing cost of the electric clamp.

SUMMARY OF THE INVENTION

An object of the invention is to provide an electric clamp constituted of parts that can be easily processed and assembled.

Another object of the invention is to provide an electric clamp having an openable cell casing to permit replacement of the dry cell.

According to the present invention, an electric connecting clamp comprises: a cell casing having a front end provided with an electrical outlet conductive member; a fixed clamping member having a cylindrical portion attached to the front end of the cell casing, and a first clamping portion of arc-shaped cross-section extending axially forward from the cylindrical portion; a movable clamping member pivotally attached to the fixed clamping member, the movable clamping member having a second clamping portion of arc-shaped cross-section which has a front end to defines a mouth with the front end of the first clamping portion, and an inclining portion which extends rearward and radially outward from the second clamping portion, the inclining portion having a pivot portion adjacent to the second clamping portion; means for biasing the second clamping portion to move to the first clamping portion; a conductor attached to the electric outlet conductive member and extending forward in the cylindrical portion and between the first and second clamping portions to the mouth; an electric contact member attached to the conductor at the mouth; and means for biasing the electric contact member toward the mouth.

The cell casing may include a cylindrical wall with an open end, and a cap threadedly attached to the open end, the cap having an annular mounting member extending forward and threadedly coupled with the cylindrical portion of the fixed clamping member.

The inclining portion of the movable clamping member further has a rear press lever extending rearward from the front end of the casing wall and being radially offset from and parallel to the cylindrical wall.

The present exemplary preferred embodiment will be described in detail with reference to the accompanying drawings, in which:

DETAILED DESCRIPTION OF THE PREFERRED EMBODIMENT

Figure 1:
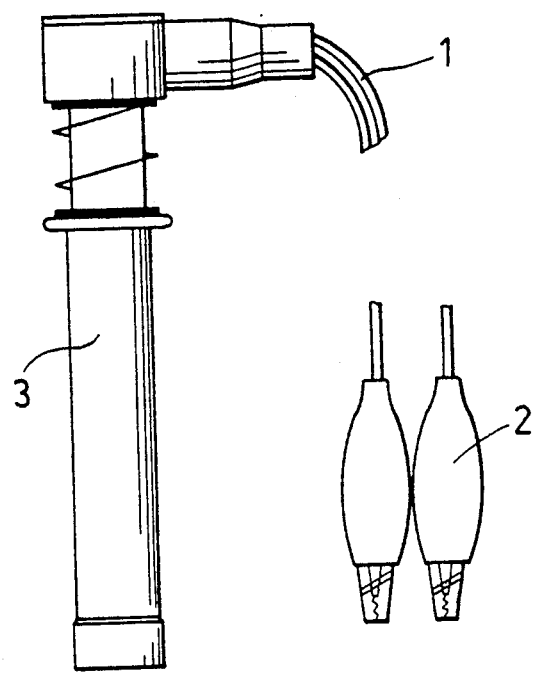
FIG. 1 shows an electric clamp in the prior art.
Figure 2:
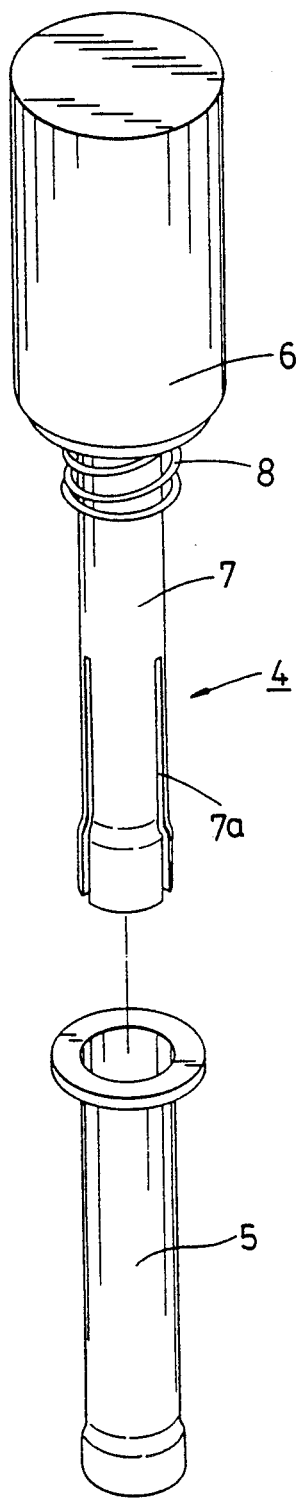
FIG. 2 shows another electric clamp in the prior art.
Figure 3:
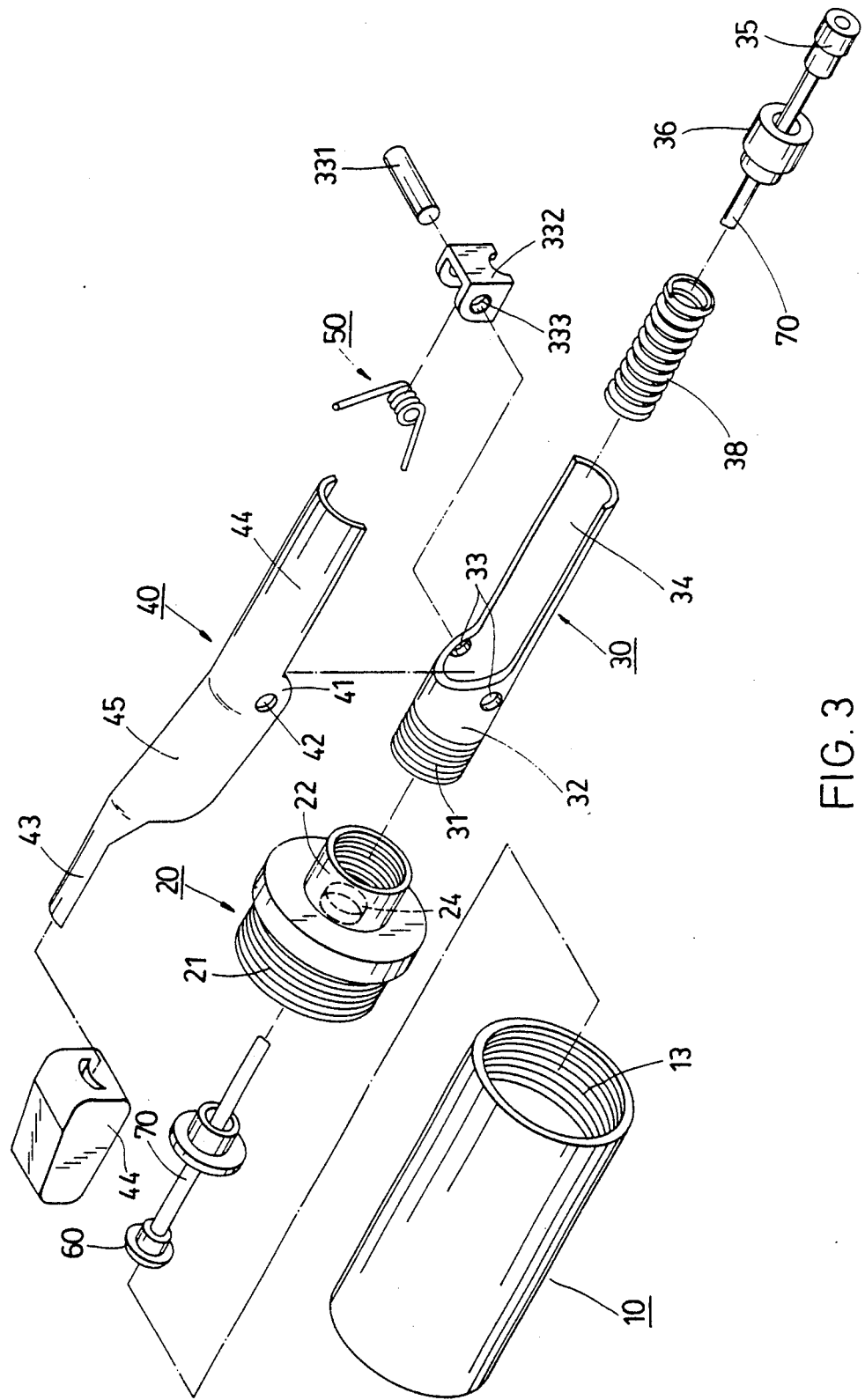
FIG. 3 is an exploded view of an electric clamp embodying the present invention.
Figure 4:
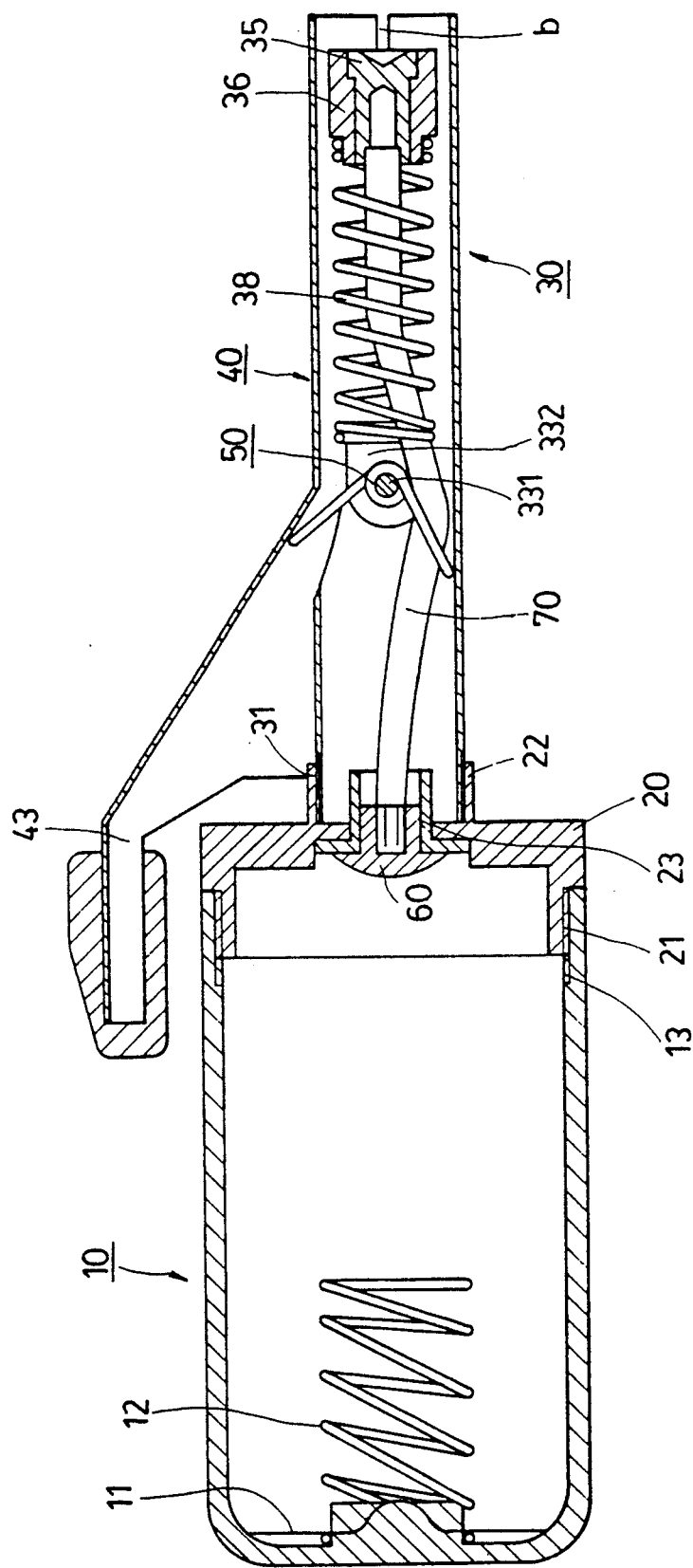
FIG. 4 is a sectional view of the electric clamp of FIG. 3 in a clamping position.
Figure 5:
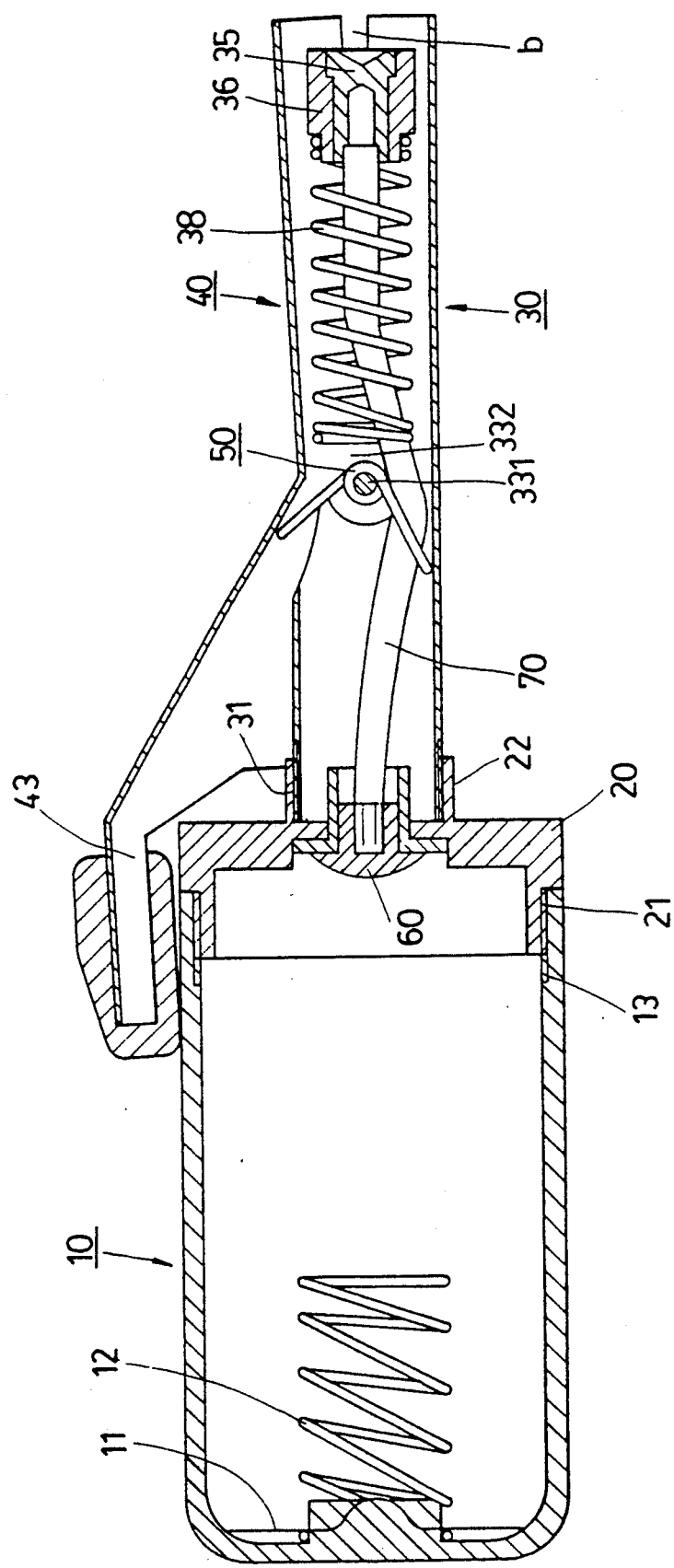
FIG. 5 is a sectional view of the electric clamp of FIG. 3 in a releasing position.

Referring to FIGS. 3, 4 and 5, an electric connecting clamp for an ignition device of a model engine embodying the present invention is shown, having a cell casing 10, a cap 20, a fixed clamping member 30, a movable clamping member 40 and a torsion spring 50.

The cell casing 10 is cylindrical and has a rear closed end to which are attached a conductive plate 11 and a helical spring 12. The cap 20 has a threaded inner annular member 21 which extends into and engages the threaded front end 13 of the cell casing 10. The cap 20 further has a threaded annular mounting member 22 opposite to the annular member 21. A conductor 70 is provided in the annular member 22 and fixed to a conductive member 60 which in turn is fitted in a hollow insulating member 23. The hollow insulating member 23 is fixed to the cap 20 at an opening 24.

The clamping member 30 has a cylindrical portion 32 which has a threaded end 31 extending into and engaging the annular mounting member 22 of the cap 20. The clamping member 30 further has a clamping portion 34 of arc-shaped cross-section which extends axially from a segment of the cylindrical portion 32. Two diametrically opposite pivot holes 33 are provided in the cylindrical portion 32 adjacent the clamping portion 34.

The movable clamping plate 40 has a clamping portion 44 of arc-shaped cross-section to cooperate with the clamping portion 34 of the clamping member 30. The front ends of the clamping portions 34 and 44 define a clamping mouth "b". The movable clamping plate 40 further has an inclining portion 45 which also has an arc-shaped cross-section and which extends rearward and radially outward from the clamping portion 44. The inclining portion 45 has a rear press lever 43 which extends rearwardly of the cap 20 and radially offset from the cylindrical wall of the casing 10. The inclining portion 45 has two opposing lobe 41 which are provided with pivot holes 42.

A U-shaped spring seat 332 is provided in the cylindrical portion 32 adjacent the pivot holes 33. A pivot pin 331 passes through the pivot holes 42, 33 and the holes 333 of the spring seat 332. A torsion spring 50 is sleeved around the pivot pin 331 within the spring seat 332 and has two ends respectively abutting the fixed and movable clamping members 30 and 40 so as to bias the clamping portion 44 to move to the clamping portion 34.

The front end of the conductor 70 extends to the mouth "b" of the clamping portions 34 and 44. A contact member 35 is attached to the front end of the conductor 70 and is surrounded by an insulating member 36. A helical spring 38 is provided around the conductor 70 between the spring seat 332 and the insulating member 36 so as to bias the contact member 35 to the mouth "b".

A power cell (not shown) can be put in the cell casing 10 by removing the cap 20. When in use, the cap 20 is turned to cause the outlet conductive member 60 to contact the terminal of the cell. Normally, the clamping portions 44 is biased to its clamping position, i.e. to move to the clamping portion 34. When the rear press lever 43 is depressed against the wall of the cell casing 10, the clamping portion 44 is moved away from the clamping portion 34. In this situation, an ignition unit can be put between the clamping portions 34 and 44 to be in contact with the contact member 35.

With the invention thus explained, it is apparent that modifications and variations can be made without departing from the scope of the invention. It is therefore intended that the invention be limited only as indicated in the appended claims.

I claim:

1. An electric connecting clamp:
   a cell casing having a front end provided with an electrical outlet conductive member;
   a fixed clamping member having a cylindrical portion attached to said front end of said cell casing, and a first clamping portion of arc-shaped cross-section extending axially forward from said cylindrical portion and having a front end;
   a movable clamping member pivotally attached to said fixed clamping member, said movable clamping member having a second clamping portion of arc-shaped cross-section which faces said first clamping portion and has a front end to define a mouth with said front end of said first clamping portion, and an inclining portion which extends rearward and radially outward from said second clamping portion, said inclining portion having a pivoted portion adjacent to said second clamping portion;
   means for biasing said second clamping portion to move to said first clamping portion;
   a conductor attached to said electric outlet conductive member and extending forward in said cylindrical portion and between said first and second clamping portions until said mouth;
   an electric contact member attached to said conductor at said mouth; and
   means for biasing said electric contact member toward said mouth.

2. An electric connecting clamp as claimed in claim 1, wherein said cell casing includes a cylindrical wall with a closed end and an open end, and a cap threadedly attached to said open end, said cap having an annular mounting member extending forward and threadedly coupled with said cylindrical portion of said fixed clamping member, said electric outlet conductive member being provided in said cap within said annular mounting member.

3. An electric connecting clamp as claimed in claim 2, wherein said inclining portion of said movable clamping member further has a rear press lever extending rearwardly from said front end of said casing wall and being radially offset from and substantially parallel with said cylindrical wall outside said cell casing.

* * * * *